(12) United States Patent
Shin et al.

(10) Patent No.: US 10,348,098 B2
(45) Date of Patent: Jul. 9, 2019

(54) MICROGRID SYSTEM INCLUDING ELECTRIC POWER LOAD

(71) Applicant: LSIS CO., LTD., Gyeonggi-do (KR)

(72) Inventors: Yong-Hark Shin, Gyeonggi-do (KR);
Jae-Seong Shim, Gyeonggi-do (KR);
Chong-Suk Song, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 193 days.

(21) Appl. No.: 15/348,386

(22) Filed: Nov. 10, 2016

(65) Prior Publication Data

US 2017/0187196 A1    Jun. 29, 2017

(30) Foreign Application Priority Data

Dec. 24, 2015 (KR) .................. 10-2015-0186829

(51) Int. Cl.
| | | |
|---|---|---|
| *H02J 5/00* | (2016.01) | |
| *H02J 13/00* | (2006.01) | |
| *H02J 3/14* | (2006.01) | |
| *H02J 3/28* | (2006.01) | |
| *H02J 3/38* | (2006.01) | |

(52) U.S. Cl.
CPC .................. *H02J 5/00* (2013.01); *H02J 3/14* (2013.01); *H02J 3/28* (2013.01); *H02J 13/00* (2013.01); *H02J 3/381* (2013.01); *Y02B 70/3225* (2013.01); *Y04S 20/222* (2013.01)

(58) Field of Classification Search
CPC .............. H02J 5/00; H02J 13/00; G06F 19/00
See application file for complete search history.

(56) References Cited

U.S. PATENT DOCUMENTS

| | | | |
|---|---|---|---|
| 8,918,221 B2 | 12/2014 | Le Roux et al. | |
| 2002/0036430 A1* | 3/2002 | Welches | .................. F02G 1/043 307/18 |
| 2005/0010493 A1 | 1/2005 | Namba | |
| 2005/0143865 A1 | 6/2005 | Gardner | |
| 2010/0274407 A1* | 10/2010 | Creed | ....................... H02J 3/14 700/295 |
| 2014/0035374 A1 | 2/2014 | Oka | |

(Continued)

FOREIGN PATENT DOCUMENTS

| | | |
|---|---|---|
| CN | 102810909 A | 12/2012 |
| CN | 103493326 A | 1/2014 |

(Continued)

OTHER PUBLICATIONS

Korean Office Action for related Korean Application No. 10-2017-0178294; action dated Jun. 29, 2018; (7 pages).

(Continued)

*Primary Examiner* — Jeffrey M Shin
(74) *Attorney, Agent, or Firm* — K&L Gates LLP

(57) ABSTRACT

The present invention relates to a micro-grid system including a load. The load includes: a distributed power source including one or more elements which generate power; and a controller configured to derive a first load pattern by measuring load data of the load when the load is added to the micro-grid system established in advance, compare the first load pattern with a preset load pattern for each load type, and operate the distributed power source based on a result of the comparison.

9 Claims, 11 Drawing Sheets

(56) References Cited

U.S. PATENT DOCUMENTS

2014/0316599 A1    10/2014   Tomita et al.
2015/0106811 A1     4/2015   Holler

FOREIGN PATENT DOCUMENTS

| | | |
|---|---|---|
| CN | 104659858 A | 5/2015 |
| EP | 2779085 A1 | 9/2014 |
| JP | S58-12539 A | 1/1983 |
| JP | 2003-250223 A | 9/2003 |
| JP | 2009245656 A | 10/2009 |
| JP | 5074268 B2 | 11/2012 |
| JP | 2013198360 A | 9/2013 |
| KR | 20090126104 A | 12/2009 |
| KR | 20130025416 A | 3/2013 |
| KR | 101259728 B1 | 5/2013 |
| KR | 10-2013-0074045 A | 7/2013 |
| KR | 20130074046 A | 7/2013 |
| KR | 101298500 B1 | 8/2013 |
| KR | 101336162 B1 | 12/2013 |
| KR | 20150038414 A | 4/2015 |
| KR | 10-1570833 B1 | 12/2015 |

OTHER PUBLICATIONS

European Search Report dated Mar. 28, 2017 corresponding to application No. 16188147.9-1804.
Korean Office Action dated Jun. 15, 2017 in connection with the counterpart Korean Patent Application.
Office Action dated Nov. 30, 2016 issued in corresponding Korean Application No. 9-5-2016-086321610.
Chinese Office Action for related Chinese Application No. 201610865897.3; action dated Nov. 30, 2019; (7 pages).

* cited by examiner

MICROGRID SYSTEM INCLUDING ELECTRIC POWER LOAD

CROSS REFERENCE TO RELATED APPLICATION

This application claims the benefit of Korean Patent Application No. 10-2015-0186829, filed on Dec. 24, 2015, entitled "MICROGRID SYSTEM INCLUDING ELECTRIC POWER LOAD", which is hereby incorporated by reference in its entirety into this application.

BACKGROUND

1. Technical Field

The present invention relates to a micro-grid system including an electric power load. In particular, the present invention relates to a micro-grid system including an electric power load, which is capable of independently operating electric power loads based on a representative load pattern depending on characteristics of the loads.

2. Description of the Related Art

Attention has been paid to the reliability of supply of power after the wide-area power outage that occurred in 2011. In order to ensure the reliability of supply of power, it is necessary to construct power plants additionally or reduce electrical power loads. However, since the addition construction of power plants involves huge costs and it is not easy to reduce the electric power loads, efficient ways to relocate the supply and consumption of power in the entire power network is attracting attention. A micro-grid system is one of such ways to relocate the supply and consumption of power.

As a small-scaled power supply system including one or more distributed power sources and one or more electric power loads, the micro-grid system is an active power distribution system which has the ability to determine and operate the consumption and supply of power independently. The micro-grid system is able to improve the reliability of domestic power system through efficient use and consumption of power of. Particularly, the micro-grid system is able to provide an independent operation function for itself to maximize the reliability of supply of power within a micro-grid system range. An example of a place where such a micro-grid system can be easily constructed may include a campus, a military unit or the like. In particular, it is possible for the campus to obtain effects of improvement of reliability of supply of power in addition to saving of electric bills.

The existing micro-grid system is constructed to include various kinds of distribution power sources whose outputs are adjusted in such a way to maximize the operating profits of the micro-grid system. Determining the outputs of the distribution powers requires prediction data such as information on electric power loads, weather, environments, and so on. However, for the electric power loads, load prediction data in the micro-grid systems are required and it is, therefore, essential to construct a load prediction system.

The load prediction system predicts a load demand based on past load history data. Accordingly, if a new electric power load is added to the existing-constructed micro-grid system, the past load history data become useless and new load prediction data accumulated for the added electric power load are required. In other words, when the configuration of the existing micro-grid system is changed, it is not possible to flexibly cope with this change.

SUMMARY

It is an aspect of the present invention to provide a micro-grid system including an electric power load, which is capable of independently operating electric power loads based on a representative load pattern depending on characteristics of the loads.

It is another aspect of the present invention to provide a micro-grid system which is capable of facilitating initial construction of a micro-grid system, reducing costs for construction to alleviate a burden on the costs for construction, and providing high expandability of the micro-grid system, and an operating method thereof.

The present invention is not limited to the above aspect and other aspects of the present invention will be clearly understood by those skilled in the art from the following description.

In accordance with one aspect of the present invention, there is provided a micro-grid system including a load. The load includes: a distributed power source including one or more elements which generate power; and a controller configured to derive a first load pattern by measuring load data of the load when the load is added to the micro-grid system established in advance, compare the first load pattern with a preset load pattern for each load type, and operate the distributed power source based on a result of the comparison.

ADVANTAGES OF THE INVENTION

According to one embodiment of the present invention, it is possible to facilitate initial construction of a micro-grid system, reduce costs for construction to alleviate a burden on the costs for construction, and provide high expandability of the micro-grid system.

According to one embodiment of the present invention, by building a micro-grid system by gradual extension through a micro-grid design suggested by the present invention, it is possible to solve difficulties in introduction of the micro-grid system due to high costs for initial construction of the micro-grid system.

DETAILED DESCRIPTION

Hereinafter, embodiments of the present invention will be described in detail in junction with the accompanying drawings. It should be understood that the present invention is not limited to the following embodiments, and that the embodiments are provided for illustrative purposes only. The present invention is not intended to exclude regressive inventions in which other elements are added, altered, deleted, etc. The present invention encompasses other different embodiments which fall within the spirit and scope of the invention.

Although the present invention is described with general terms which are currently being in wide use, terms arbitrarily selected by the applicant may be used for particular cases. In these cases, the meanings of the terms are described in relevant portions of the detailed description of the invention. Therefore, the present invention should be construed with the meaning of the terms, not just the name of the terms. In the following description, the term 'include(s)' is not intended to exclude other elements or steps which are not enumerated in the description.

Figure 1:
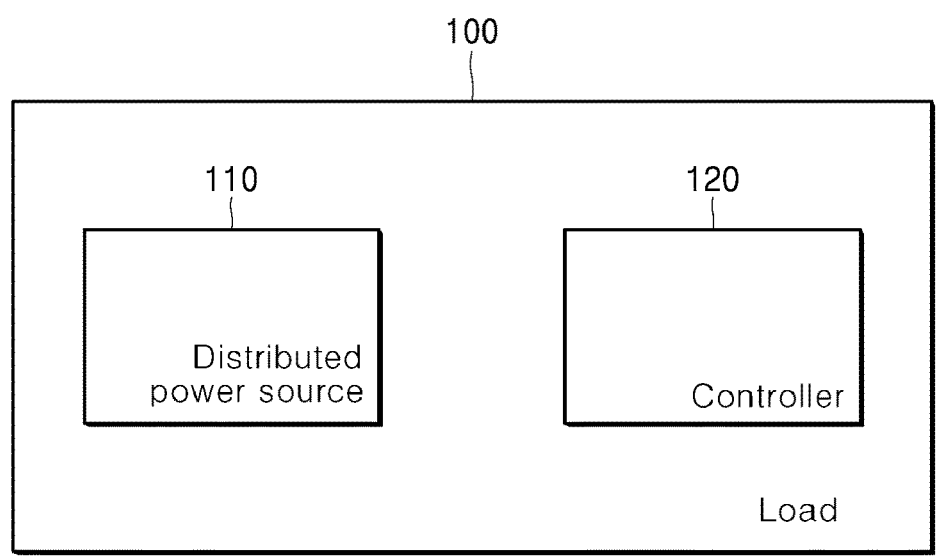
FIG. 1 is a diagram illustrating the configuration of an electric power load included in a micro-grid system according to one embodiment of the present invention.

FIG. 1 is a diagram illustrating the configuration of an electric power load included in a micro-grid system according to one embodiment of the present invention.

A micro-grid system is an aggregation of generators, storages and loads which are distributed here and there and are operated in one controllable unit. The micro-grid system may be a power network unit which is operated in parallel to or independent of an existing power grid.

Referring to FIG. 1, an electric power load 100 (hereinafter simply referred to as a "load 100") included in the micro-grid system may include a distribution power source 110 and a controller 120.

The distribution power source 110 includes at least one of power generating elements which are small-scaled power generating elements, including a wind turbine, a photovoltaic system, a fuel cell, a geothermal power generator, a micro-turbine, a combustion turbine, a reciprocating engine, a heat-power hybrid system, a hydroelectric power generator, and the like.

The distributed power source 110 may be installed in or removed from the micro-grid system irrespective of the performance or power output of the micro-grid system. That is, the distributed power source 110 can be autonomously operated independent of the micro-grid system.

If a load is added to the established micro-grid system, the controller 120 may measure load data for the added load to derive a first load pattern. Then, the controller 120 may compare the first load pattern with a preset load pattern for each load type and operate the distributed power source 110 based on a result of the comparison.

The load data may include measurement values for all load elements which can be measured and controlled. For example, in a case of lecture hall, the load data mean power consumption of lamps, air conditioners and so on.

Specifically, the controller 120 can change at least one of a combination and a power generation plan of elements included in the distributed power source 110 in response to the load pattern for each load type.

Here, the load pattern for each load type refers to a load pattern which indicates power consumption according to a time zone and is divided according to the characteristics of the load. In this case, the power consumption means the sum of power consumption of all load elements included in the load.

The load pattern for each load type means an ideal pattern used according to the load characteristics and is also referred to as a representative load pattern, which will be described later with reference to FIGS. 2 to 4.

In one embodiment, the controller 120 may select a second load pattern, which is most similar to the first load pattern, from the load pattern for each load type and operate the distributed power source 110 based on the selected second load pattern.

In another embodiment, if there exists no second load pattern most similar to the first load pattern, the controller 120 may newly add the first load pattern to the load pattern for each load type. In this case, the controller 120 may operate the distributed power source 110 based on the added first load pattern.

In a further embodiment, the controller 120 may determine a second load pattern most similar to the first load pattern and adjust the first load pattern to the second load pattern.

In one embodiment, the load 100 included in the micro-grid system may further include a communication unit (not shown). In this case, the communication unit (not shown) can conduct communication with the micro-grid system or another load included in the micro-grid system. To this end, the controller 120 can control the communication unit to acquire information on the load pattern for each load type.

Figure 2:
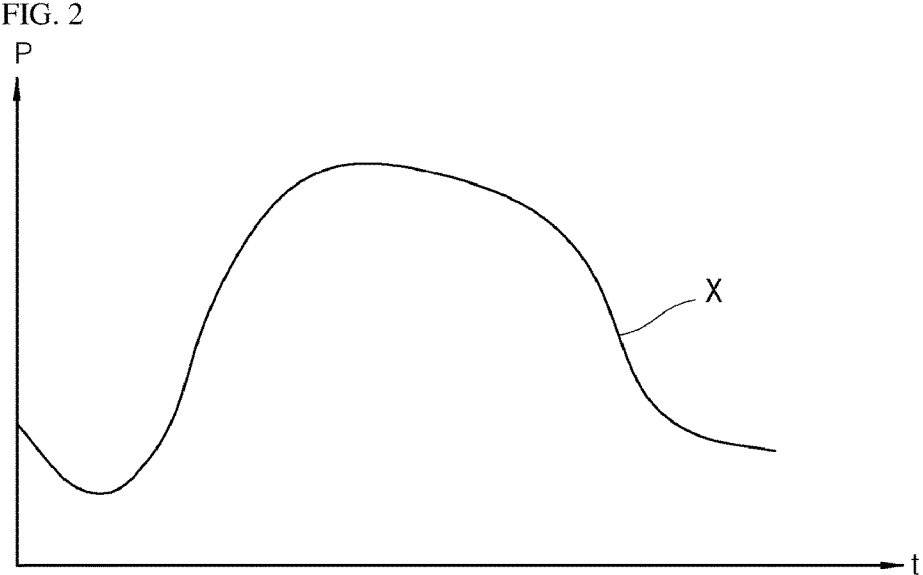
FIGS. 2 to 4 are graphs showing an electric power load pattern for each electric power load type according to one embodiment of the present invention.
Figure 3:
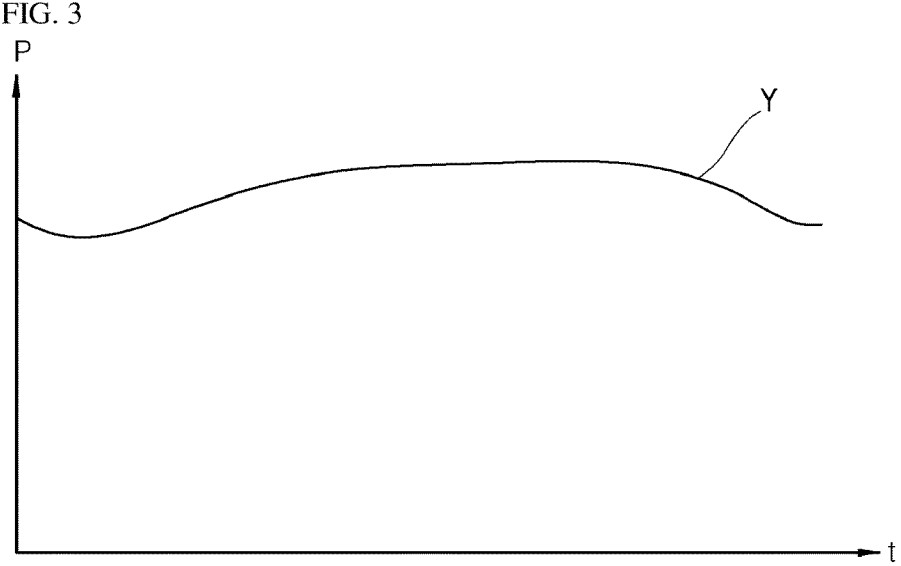
Figure 4:
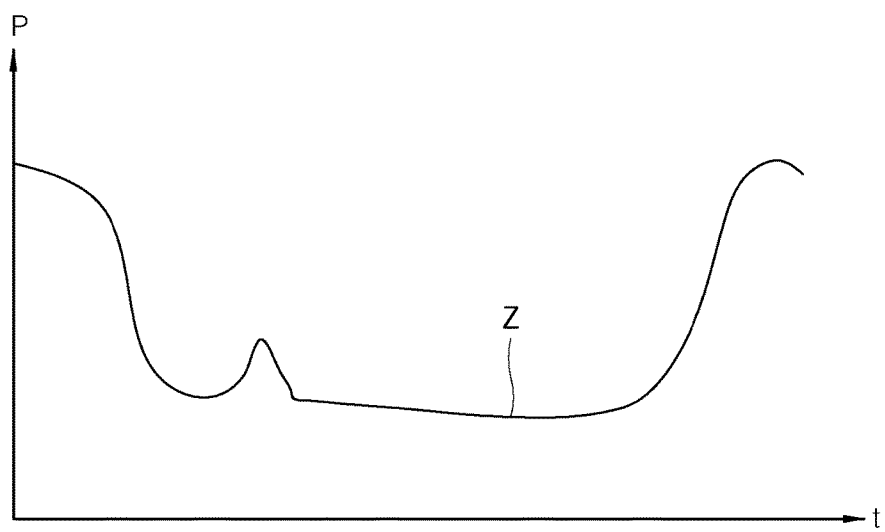

FIGS. 2 to 4 are graphs showing a load pattern for each load according to one embodiment of the present invention.

The load 100 in the micro-grid system may be classified based on load characteristics. For example, a university campus may be divided into a lecture hall (or building), a research building, a boarding building, a laboratory building, etc., each of which corresponds to the load. It is assumed that one having a similar load pattern curve of these buildings has the same load type.

As shown in FIGS. 2 to 4, the load pattern for each load type may be obtained by classifying a change in power consumption over time based on the load characteristics. In each of FIGS. 2 to 4, an axis represent time (x) and a y axis represents power (P).

FIG. 2 shows a load pattern of an administrative center (or building) type in which power is consumed during regular working hours but is not consumed out of the regular working hours. Therefore, the load pattern of the administrative center type may be represented by a curve X indicating a normal distribution of power consumption during the time period from A.M. to P.M. Further, a load pattern of a lecture hall may be represented as the curve X indicating the normal distribution. That is, the lecture hall may have a load pattern similar to that of the administrative center.

FIG. 3 shows a load pattern of a laboratory building type in which power continues to be consumed for 24 hours by its nature since experiments and researches are continued without interruption in the building. Therefore, the load pattern of the laboratory building type may be represented by a curve Y close to a straight line indicating that power consumption is evenly distributed over the whole time zone all day.

FIG. 4 shows a load pattern of a boarding building type in which power is mainly consumed in a time zone except for regular school hours. Therefore, the power consumption increases in the dawn and morning before the regular school hours and after the evening after termination of the regular school hours and decreases in other times. Therefore, the load pattern of the boarding building type may be represented by a curve Z showing a distribution opposite to that of the administrative center shown in FIG. 2.

Buildings having similar load characteristics have similar load patterns. Therefore, different load patterns for different load types can be derived based on the load characteristics. For example, different load patterns for different load types can be derived as listed in the following table 1.

TABLE 1

| Load Type | Building | Maximum power consumption hours | |
| --- | --- | --- | --- |
| | | Weekday (Monday to Friday) | Weekend, Holliday |
| Laboratory Type | Laboratory building, Data center | 0~24 hours | 0~24 hours |
| Boarding Type | Boarding building, Residential building, Apartment | 7 a.m.~8 a.m. | 8 a.m.~11 p.m. |
| Administration Type | Administrative center, Lecture hall, Office building | 8 a.m.~7 p.m. | — |
| Arcade Type | Commercial building | 8 p.m.~2 a.m. | 8 a.m.~8 p.m. |

Buildings belonging to the same load type have similar load pattern curves. Therefore, based on the different load patterns for different load types, it is possible to predetermine a combination and a power generation plan of controllable load elements (such as electric heat pumps (EHPs), lamps and the like).

It is shown in FIGS. 2 to 4 that the power demand is measured to derive the load patterns. It is, however, noted that the load patterns may be derived in different ways according to a variety of embodiments, such as measuring power demand according to day of the week, seasons and specific holidays to derive the load patterns.

According to this embodiment, the loads are independently operated depending on the load pattern for each load type. This facilitates a change in elements of the micro-grid system. Specifically, the loads as the elements can be easily added to or deleted from the micro-grid system.

In particular, in a case where a load is added to an initially-constructed micro-grid system, in the past, power consumption was analyzed and predicted after the load was added to the entire load of the constructed micro-grid system. In contrast, in the present invention, a load pattern for each load type is predetermined according to the load characteristics. Then, based on the predetermined load pattern for each load type, the micro-grid system carries out operation optimization by a power generation plan or load reduction of distributed power sources of established loads or newly-added loads.

Specifically, in a case where the operation optimization by the power generation plan of the distributed power sources is carried out, an optimal operation method is provided by providing an optimal combination of the distributed power sources for each load type, as in this embodiment. For example, when a load type of a particular building is determined, the micro-grid system may include a function of recommending a power source configuration and a capacity selection of a renewable power source (such as a solar cell, an energy storage device or the like) in accordance to its load level or load form.

Hereinafter, a method of analyzing a type of a load added based on the load pattern of each load type will be described in detail with reference to FIGS. 5 and 6.

Figure 5:
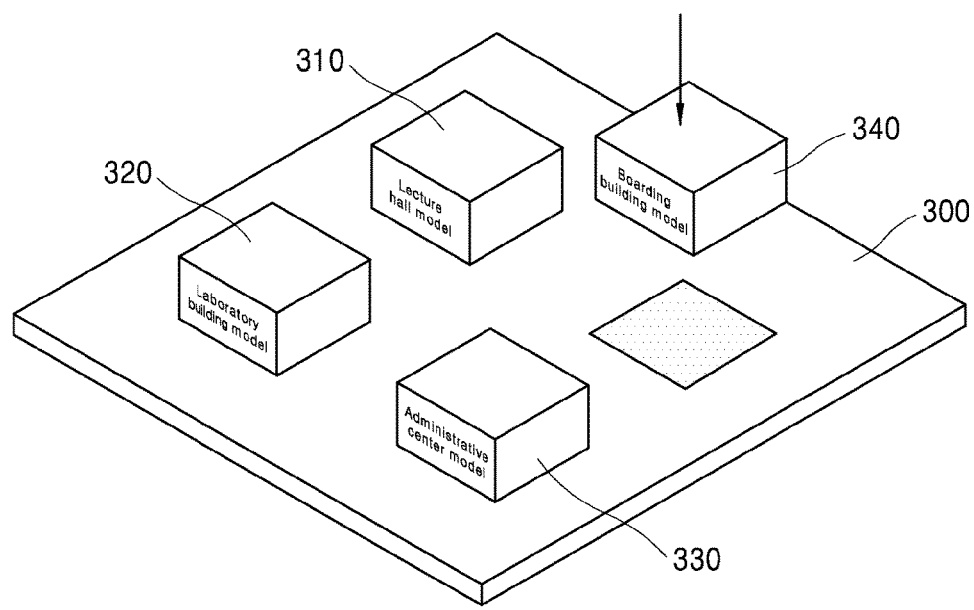
FIG. 5 is a schematic view illustrating a state where an electric power load is added to a micro-grid system according to one embodiment of the present invention.

FIG. 5 is a schematic view illustrating a state where a load is added to a micro-grid system according to one embodiment of the present invention. FIG. 6 is a graph showing a load pattern of the added load according to one embodiment of the present invention.

Referring to FIG. 5, a load 340 corresponding to a boarding building model is newly added to a micro-grid system 300. It is here noted that a load 310 corresponding to a lecture hall model, a load 320 corresponding to a laboratory building model and a load 330 corresponding to an administrative center model are already constructed in the micro-grid system 300.

In this case, the load 310 corresponding to a lecture hall model refers to a load having a load type of the lecture hall type. Therefore, not only the lecture hall but also different buildings having the load characteristics similar to those of the lecture hall may be included in the load 310 corresponding to the lecture hall model. Likewise, the load 320 corresponding to a laboratory building model and the load 330 corresponding to an administrative center model may be defined in the same way. On the other hand, as described earlier with reference to FIGS. 2 to 4, since the load 310 corresponding to a lecture hall model and the load 330 corresponding to an administrative center model have the similar load characteristics, the two loads may be defined by a group having the same load characteristics. In this case, whether or not the two loads have the similar load characteristics may be made based on a comparison between load patterns of the two loads to determine whether or not the load patterns have a similarity set by a user or by experiment.

Conventionally, the sum of all of the loads included in the micro-grid system 300 has been analyzed for each time zone and the distributed power sources have been operated based on a result of the analysis. Specifically, the sum of the load 310 corresponding to the lecture hall model, the load 320 corresponding to the laboratory building model and the load 330 corresponding to the administrative center model in FIG. 5 was analyzed for each time zone, power demand for the loads was predicted, and the distributed power sources were planned and operated based on the prediction. Accordingly, when a new load, i.e., the load 340 corresponding to the boarding building model, is added to the micro-grid system 300 as shown in FIG. 5, it is necessary to accumulate new data on power consumption of all of the loads for prediction of power demand.

According to one embodiment of the present invention, in contrast, each of the loads included in the micro-grid system 300 operates its own distributed power source based on the corresponding load pattern. Specifically, in FIG. 5, the load 310 corresponding to the lecture hall model operates its own distributed power source based on the load pattern of the corresponding load 310, the load 320 corresponding to the laboratory building model operates its own distributed power source based on the load pattern of the corresponding load 320, and the load 330 corresponding to the administrative center model operates its own distributed power source based on the load pattern of the corresponding load 330.

If a new load is added to the micro-grid system 300, an analysis is made to determine a load type to which the corresponding load belongs, and the micro-grid system 300 is reconstructed based on the determined load type. In this case, the micro-grid system 300 measures the load data on the added load and selects a corresponding load pattern of each load type.

On the other hand, as a result of comparison of a load pattern of the newly-added load with the corresponding load pattern for each load type, if there is a difference therebetween, a load for a portion having the difference can be reduced. Specifically, a portion determined to be wasted through the comparison between the load patterns can be reduced. For example, the load reduction can be achieved through a change in setting temperature of an air-conditioner, turning-on of some lamps and power generation of distributed power sources. Although there is no case where a load unused is increased, it may appear as if a load is increased through charging of an energy storage device or the like in a time interval (such as the dawn) in which electric bills are low.

The reason for comparing the load pattern of the newly-added load with the corresponding load pattern for each load type is that the load pattern for each load type means an ideal load pattern used in a load having the corresponding load characteristics. The load pattern for each load type is set by analyzing a variety of loads in advance. However, if a load having a load pattern mismatching an old load pattern of each load type is added, a new load pattern of each load type may be added.

A method of reducing a load includes a method of directly reducing a load and a method of indirectly reducing a load through power generation of a distributed power source in possession. In the present invention, it is possible to automatically perform direct/indirect load control through optimal operation control for load reduction.

Figure 6:
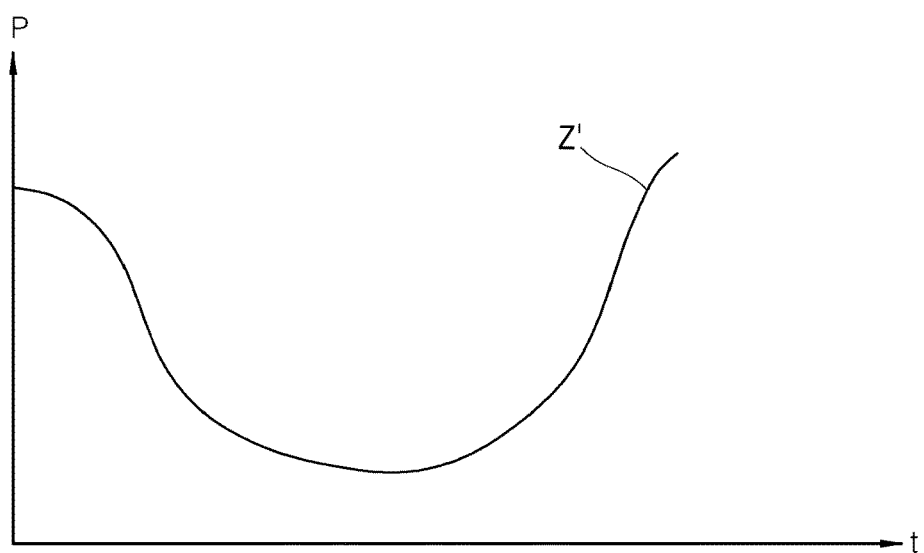
FIG. 6 is a graph showing an electric power load pattern of the added electric power load according to one embodiment of the present invention.

A load pattern Z' of the load 340 corresponding to the added boarding building model is shown in FIG. 6. The load pattern Z' of the added load 340 is similar to the load pattern for each load type shown in FIG. 4. Therefore, for the load pattern of FIG. 4, according to a distributed power source operating method set in advance, a distributed power source will be configured, or power will be generated from a distributed power source, or a load will be reduced.

Figure 7:
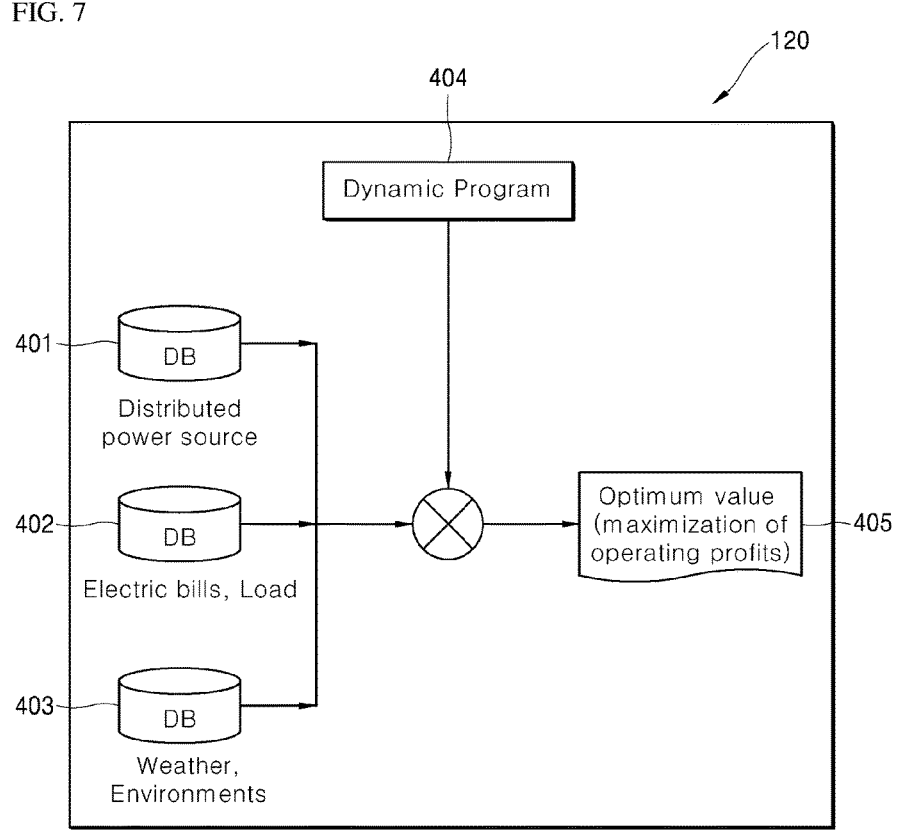
FIG. 7 is a diagram used to explain a method of operating a distributed power source for an electric power load according to one embodiment of the present invention.

FIG. 7 is a diagram used to explain a method of operating a distributed power source for a load according to one embodiment of the present invention.

An output of a distributed power source may be adjusted in such a way to maximize the operating profits of a micro-grid system. Specifically, referring to FIG. 7, the controller 120 measures data on distributed power sources, electric bills, loads, weather, environments, etc., and builds databases of the measured data. In this case, as illustrated in FIG. 7, the built databases may include a distributed power source-related database 401, an electric bill and load-related database 402, and a weather and environments-related database 403.

Thereafter, the controller 120 can perform an operation on data stored in the databases 401, 402 and 403 according to a dynamic program 404 which reflects a state of data varying in real time to perform a control operation. Thus, the controller 120 can derive an optimum value 405 which can maximize the operating profits.

Figure 8:
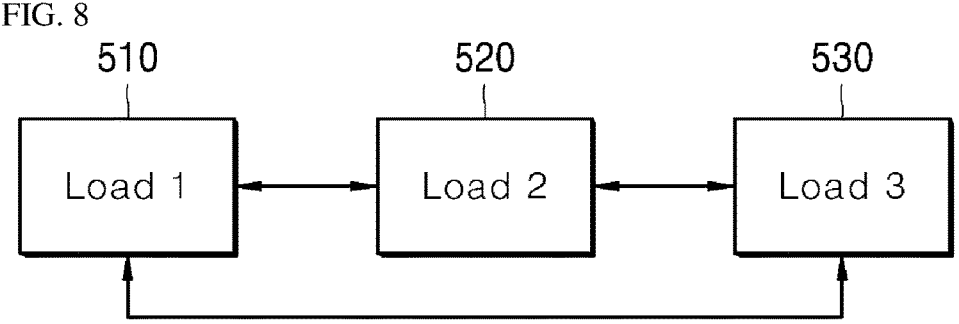
FIG. 8 is a diagram used to explain a method of controlling electric power loads according to one embodiment of the present invention.
Figure 9:
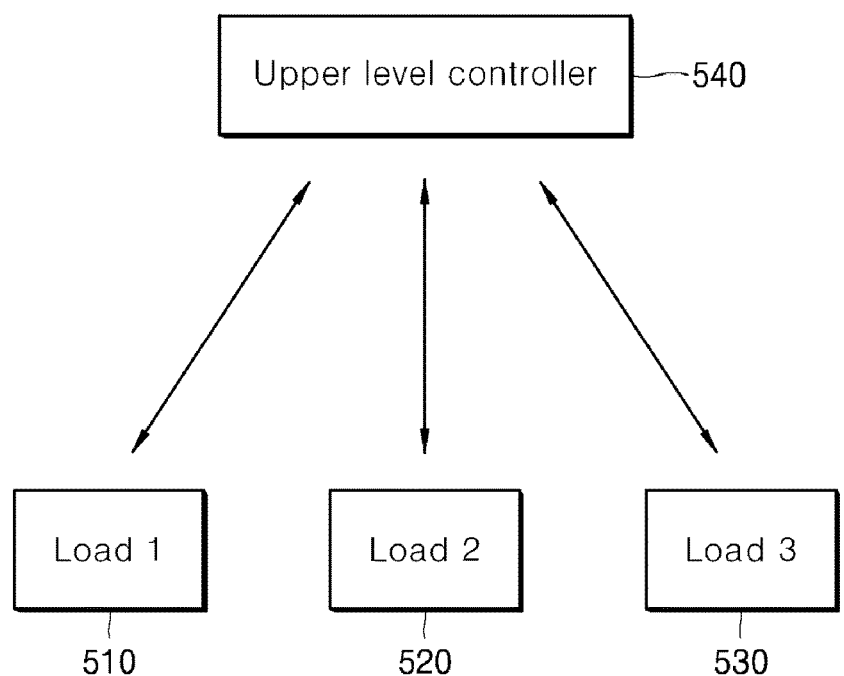
FIG. 9 is a diagram used to explain a method of controlling electric power loads according to another embodiment of the present invention.

FIG. 8 is a diagram used to explain a method of controlling loads according to one embodiment of the present invention. FIG. 9 is a diagram used to explain a method of controlling loads according to another embodiment of the present invention.

It is shown in FIG. 8 that a plurality of loads included in the micro-grid system is controlled in a distributed manner allowing the loads to control themselves while exchanging load data thereamong. Specifically, referring to FIG. 8, a load 1 (510), a load 2 (520) and a load 3 (530) exist in the micro-grid system. The loads may be, for example, buildings included in a campus. In this case, the load 1 (510), the load 2 (520) and the load 3 (530) can independently operate distributed power sources for their respective buildings and exchange information on the load data thereamong.

It is shown in FIG. 9 that a plurality of loads included in the micro-grid system is controlled in a centralized manner allowing the loads to control themselves while being subjected to the overall control by an upper level controller. Specifically, referring to FIG. 9, a load 1 (510), a load 2 (520) and a load 3 (530) exist in the micro-grid system. The loads can be controlled by the upper level controller 540 to manage the loads at an upper level of the micro-grid system. In this case, the load 1 (510), the load 2 (520) and the load 3 (530) can independently operate distributed power sources for their respective buildings and are all subjected to system level control by the upper level controller 540.

Figure 10:
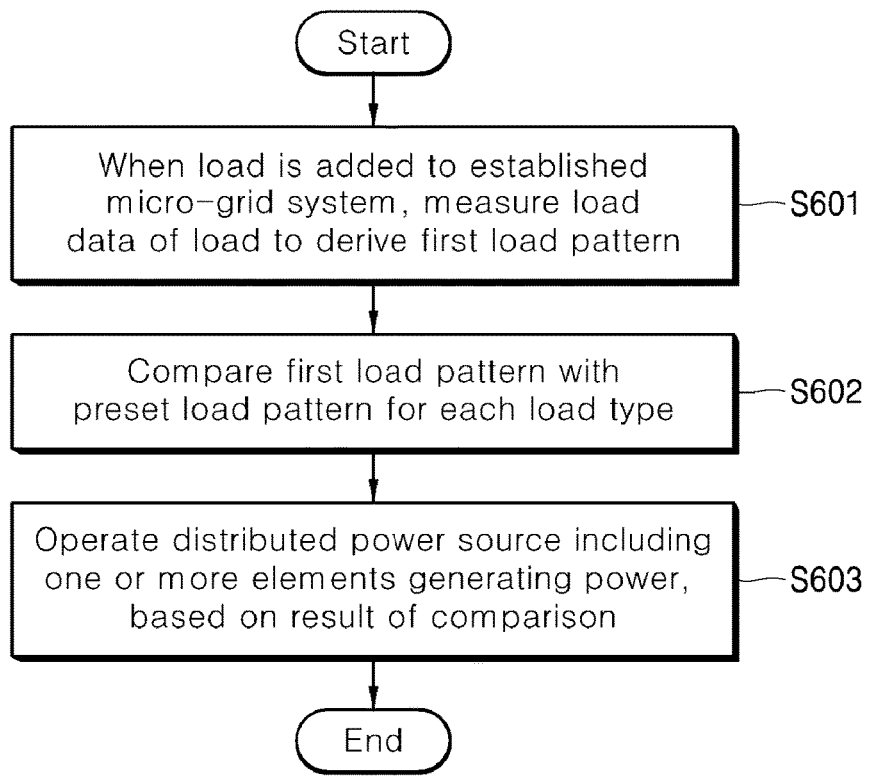
FIG. 10 is a flow chart illustrating a process of operating an electric power load included in the micro-grid system according to one embodiment of the present invention.

FIG. 10 is a flow chart illustrating a process of operating a load included in the micro-grid system according to one embodiment of the present invention.

When a load is added to the established micro-grid system, the load measures load data of the load to derive a first load pattern (S601).

The load compares the first load pattern with a preset load pattern for each load type (S602).

The load operates a distributed power source including one or more elements generating power, based on a result of the comparison (S603).

Specifically, the load can change at least one of a combination and a power generation plan of the elements in response to the load pattern for each load type.

In one embodiment, the load can select a second load pattern, which is most similar to the first load pattern, from the load pattern for each load type and operate the distributed power source based on the selected second load pattern.

In another embodiment, if there exists no second load pattern most similar to the first load pattern, the load may newly add the first load pattern to the load pattern for each load type. In this case, the load may operate the distributed power source based on the added first load pattern.

Here, the second load pattern most similar to the first load pattern may mean a load pattern having the highest similarity to the first load pattern.

Figure 11:
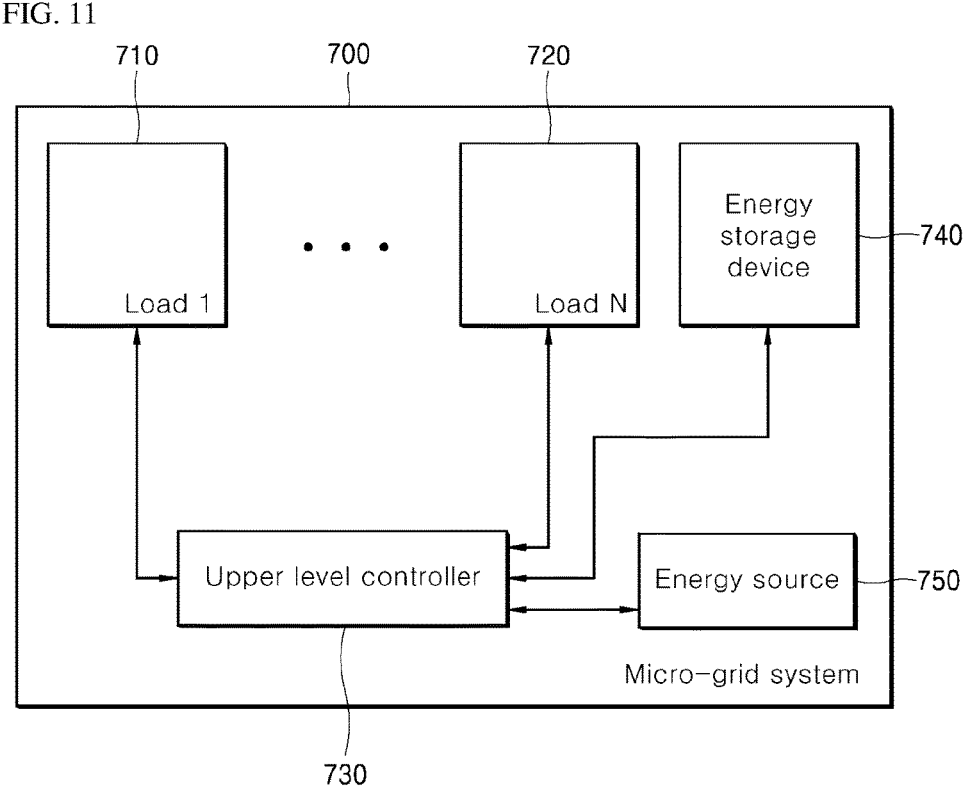
FIG. 11 is a diagram illustrating the configuration of a micro-grid system according to one embodiment of the present invention.

FIG. 11 is a diagram illustrating the configuration of a micro-grid system according to one embodiment of the present invention.

A micro-grid system is an aggregation of generators, storages and loads which are distributed here and there and are operated in one controllable unit. The micro-grid system can utilize electric energy produced by nodes located at edges of networks to maximize the whole network energy.

Referring to FIG. 11, a micro-grid system 700 may include a plurality of loads 710 and 720, an upper level controller 730, an energy storage device 740 and an energy source 750.

The plurality of loads 710 and 720 can operate distributed power sources in accordance to their respective power consumption.

In addition, when a load is added to the established micro-grid system, load data of the load may be measured to derive a first load pattern. Next, the first load pattern may be compared with a preset load pattern for each load type and then the distributed power sources may be operated based on a result of the comparison, as described previously.

The upper level controller 730 manages the plurality of loads 710 and 720 at an upper level of the micro-grid system 700. In this case, the upper level controller 730 may cooperate or communicate with the plurality of loads 710 and 720 incorporated in the micro-grid system 700 in order to perform a specific task related to the plurality of loads 710 and 720.

In addition, the upper level controller 730 may store load pattern information for each load and load data of connected loads in a database (not shown), receive added load data and create a load database, or/and issue a distributed power source control or load control instruction.

In the meantime, for the purpose of improvement of energy use efficiency, power quality and reliability, solution of environmental problems, etc., the micro-grid system 700 may be connected to a power system or may be independently operated. Specifically, the micro-grid system 700 can be set to be operated in association with an upper level power system at ordinary time and independently operated in the event of a failure in the upper level power system. To this end, the micro-grid system 700 can be operated in (i) an associated operation mode in which the micro-grid system 700 can be operated in association with the upper level power system and (ii) an independent operation mode in which the micro-grid system 700 can be operated independent of the upper level power system.

The associated operation mode requires a function of controlling active and reactive power of association points and the independent operation mode requires a function of controlling a frequency and a voltage, both of which can be performed by the upper level controller 730.

The energy storage device 740 may be a battery energy storage system or a super conducting magnetic storage (SMES) and can store power generated and supplied by the energy source 750 which will be described below. The power stored in the energy storage device 740 can be used for later power demand and supply of the micro-grid system.

The energy source 750 may be at least one of power sources including a boiler, a combined heat and power generator, a fuel cell and a micro-turbine or at least one of renewable energy sources including a solar power generator and a wind power generator.

The energy source 750 can generate and supply power according to situations of power demand and supply of the micro-grid system.

According to the aforementioned embodiments of the present invention, it is possible to facilitate initial construction of a micro-grid system, reduce costs for construction to alleviate a burden on the costs for construction, and provide high expandability of the micro-grid system.

Furthermore, by building a micro-grid system by gradual extension through a micro-grid design suggested by the present invention, it is possible to solve difficulties in introduction of the micro-grid system due to high costs for initial construction of the micro-grid system.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A micro-grid system including a load, wherein the load includes:
   a distributed power source including one or more elements which generate power; and
   a controller configured to operate the distributed power source based on a corresponding load pattern, the controller further configured to
      derive a first load pattern by measuring power consumption of all load elements included in the load when the load is added to the micro-grid system established in advance,
      compare the first load pattern with preset load patterns for each of load types,
      select a second load pattern which is most similar to the first load pattern from the preset load patterns, and
      operate the distributed power source based on the selected second load pattern,
   wherein the first load pattern indicates power consumption which is sum of power consumption of all load elements included in the load according to a time zone,
   wherein the preset load patterns for each of load types indicate power consumption according to a time zone of each of load types.

2. The micro-grid system according to claim 1, wherein the controller changes at least one of a combination and a power generation plan of the elements included in the distributed power source in response to the load pattern for each load type.

3. The micro-grid system according to claim 1, wherein, if there exists no second load pattern most similar to the first load pattern from the load pattern for each load type, the controller newly adds the first load pattern to the load pattern for each load type and operates the distributed power source based on the added first load pattern.

4. The micro-grid system according to claim 1, further comprising a communication unit configured to conduct communication with the micro-grid system or other loads included in the micro-grid system,
   wherein the controller controls the communication unit to acquire information on the load pattern for each load type.

5. The micro-grid system according to claim 1, wherein the elements include small-scaled power generating elements, including a wind turbine, a photovoltaic system, a fuel cell, a geothermal power generator, a micro-turbine, a combustion turbine, a reciprocating engine, a heat-power hybrid system and a hydroelectric power generator.

6. The micro-grid system according to claim 1, further comprising an upper level controller configured to adjust an output of the distributed power source so as to maximize the operating profits of the micro-grid system.

7. The micro-grid system according to claim 1, wherein the controller presets a combination of optimal distributed power sources in response to the load pattern for each load type.

8. The micro-grid system according to claim 1, further comprising an energy storage device and an energy source,
   wherein the controller controls at least one of the energy storage device and the energy source in adjustment of the load by the load pattern for each load type.

9. The micro-grid system according to claim 1, further comprising an upper level controller configured to derive a first load pattern by measuring load data of the load when the load is added to the micro-grid system established in advance, compare the first load pattern with a preset load pattern for each load type, and operate the distributed power source based on a result of the comparison.

* * * * *